United States Patent [19]

Clarke

[11] 3,900,556
[45] Aug. 19, 1975

[54] PROCESS FOR THE CONTINUOUS CARBONIZATION AND GRAPHITIZATION OF A STABILIZED ACRYLIC FIBROUS MATERIAL

[75] Inventor: Charles M. Clarke, Watchung, N.J.

[73] Assignee: Celanese Corporation, New York, N.Y.

[22] Filed: Apr. 17, 1972

[21] Appl. No.: 244,990

Related U.S. Application Data

[63] Continuation of Ser. No. 777,275, Nov. 20, 1968, abandoned.

[52] U.S. Cl. .................................. 423/447; 264/29
[51] Int. Cl. ........................................... C01b 31/07
[58] Field of Search ............... 423/447, 448; 264/29

[56] References Cited
UNITED STATES PATENTS

| 3,285,696 | 11/1966 | Tsunoda ..................... 423/447 X |
| 3,508,874 | 4/1970 | Rulison ......................... 423/447 |
| 3,528,774 | 9/1970 | Ezekiel et al. ................ 423/447 |
| 3,539,295 | 11/1970 | Ram............................... 423/447 |
| 3,547,584 | 12/1970 | Santangelo..................... 423/447 |
| 3,552,923 | 1/1971 | Carpenter et al. ............. 423/447 |
| 3,634,035 | 1/1972 | Stuetz et al. .................. 423/447 |
| 3,635,675 | 1/1972 | Ezekiel ........................... 423/447 |

OTHER PUBLICATIONS

Ezekiel et al. (II), Journal of Polymer Science, Part C, No. 19, (1967), pp. 249–265.

Primary Examiner—Edward J. Meros

[57] ABSTRACT

A continuous process is provided for the rapid conversion of a continuous length of a stabilized acrylonitrile homopolymer or copolymer to a carbonized form exhibiting high strength characteristics. The stabilized starting material while present in an inert atmosphere is passed through a heating zone in which its temperature is relatively rapidly elevated under conditions found capable of producing a high strength carbonized product. The resulting continuous length of carbonized product may be subsequently converted to a continuous length of graphitic carbon possessing both high tenacity and high modulus.

13 Claims, 6 Drawing Figures

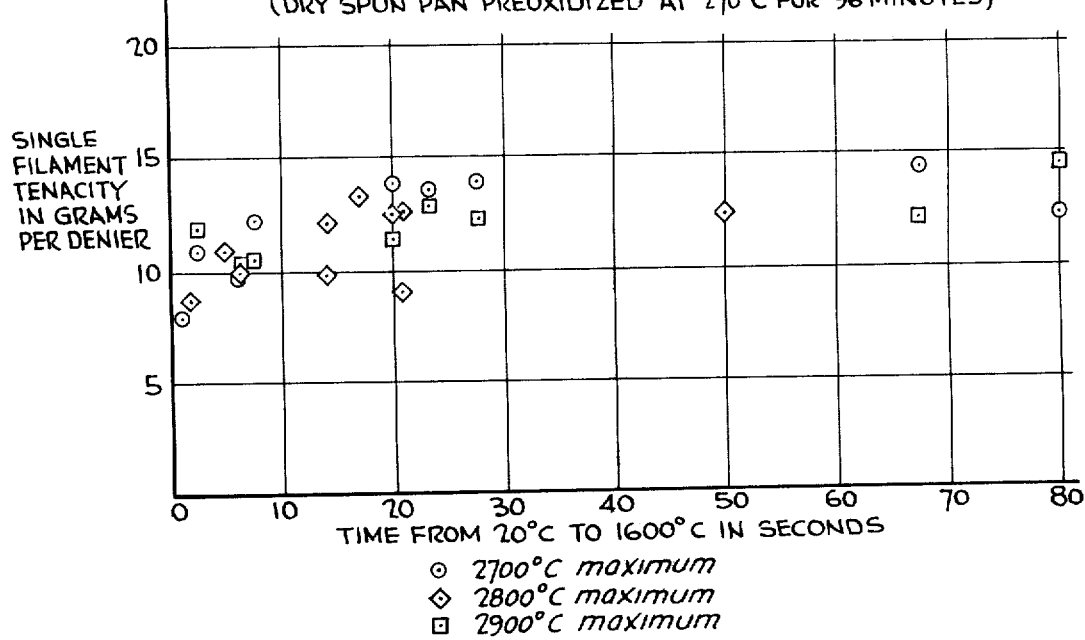

FIG. 1 EFFECT OF PERIOD OF TEMPERATURE ELEVATION TO 1600°C ON TENACITY OF CARBONIZED AND GRAPHITIZED PRODUCT (DRY SPUN PAN PREOXIDIZED AT 270°C FOR 96 MINUTES)

⊙ 2700°C maximum
◇ 2800°C maximum
☐ 2900°C maximum

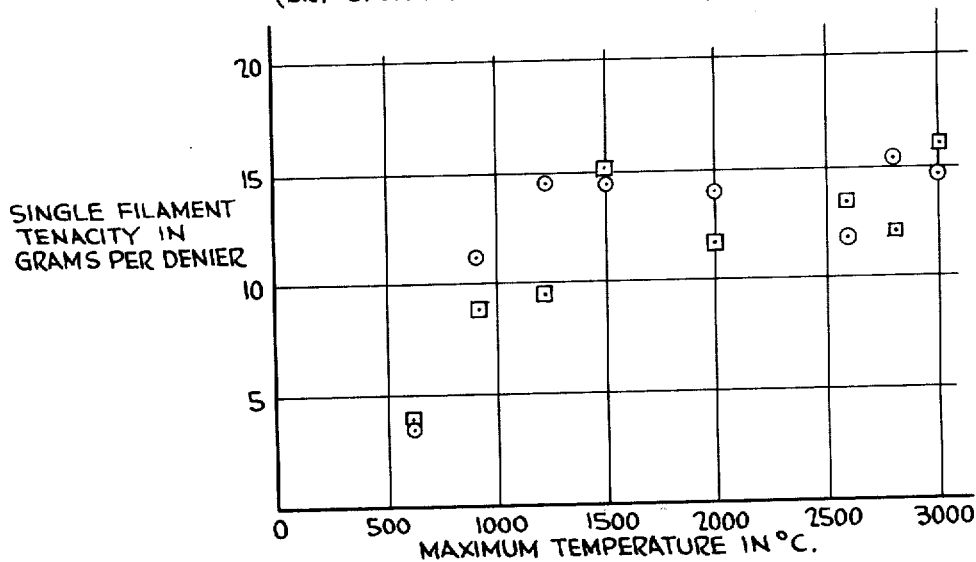

FIG. 2 EFFECT OF TEMPERATURE ON SPECIFIC TENSILE STRENGTH (DRY-SPUN PAN PREOXIDIZED AT 270°C FOR 96 MINUTES)

⊙ 60 seconds from 20°C to 1600°C or to maximum temperature if maximum temperature is less than 1600°C, and 15 seconds at maximum temperature.

☐ 120 seconds from 20°C to 1600°C or to maximum temperature, if maximum temperature is less than 1600°C, and 30 seconds at maximum temperature.

INVENTOR,
CHARLES M. CLARKE

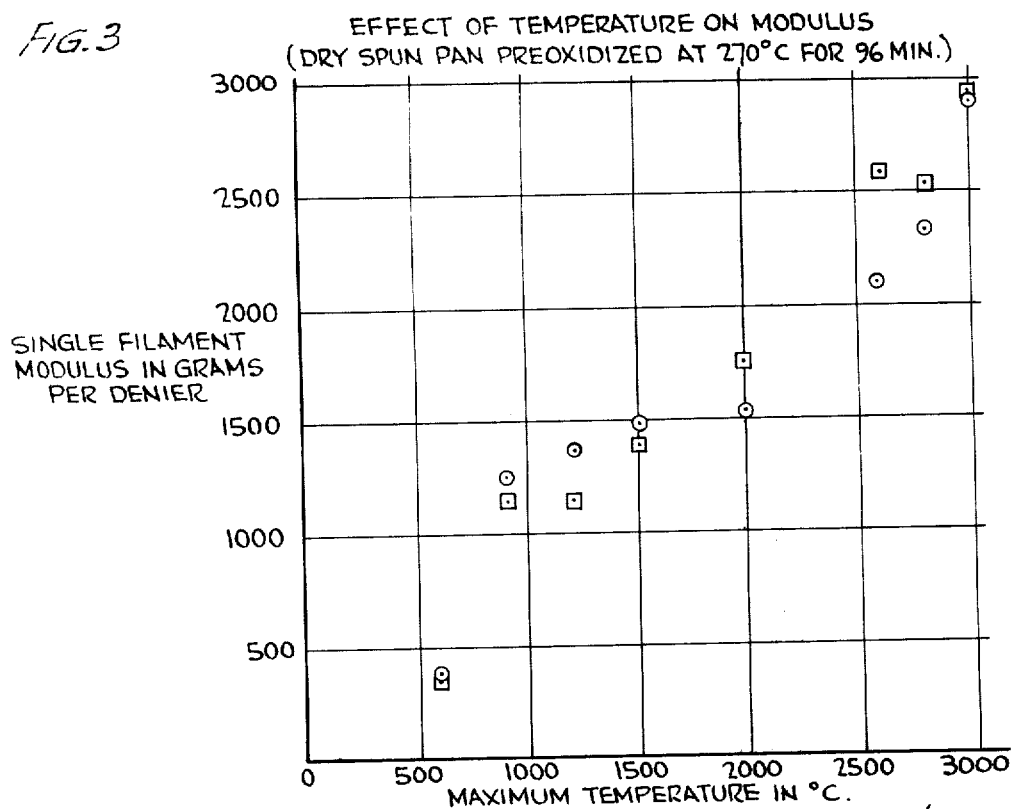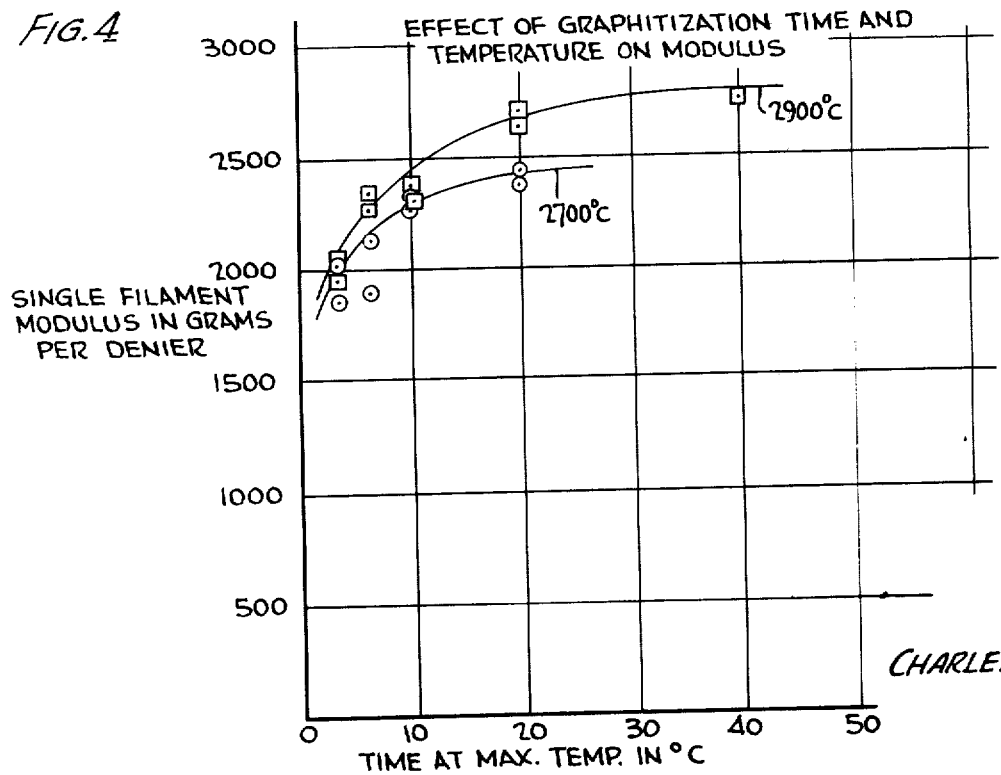

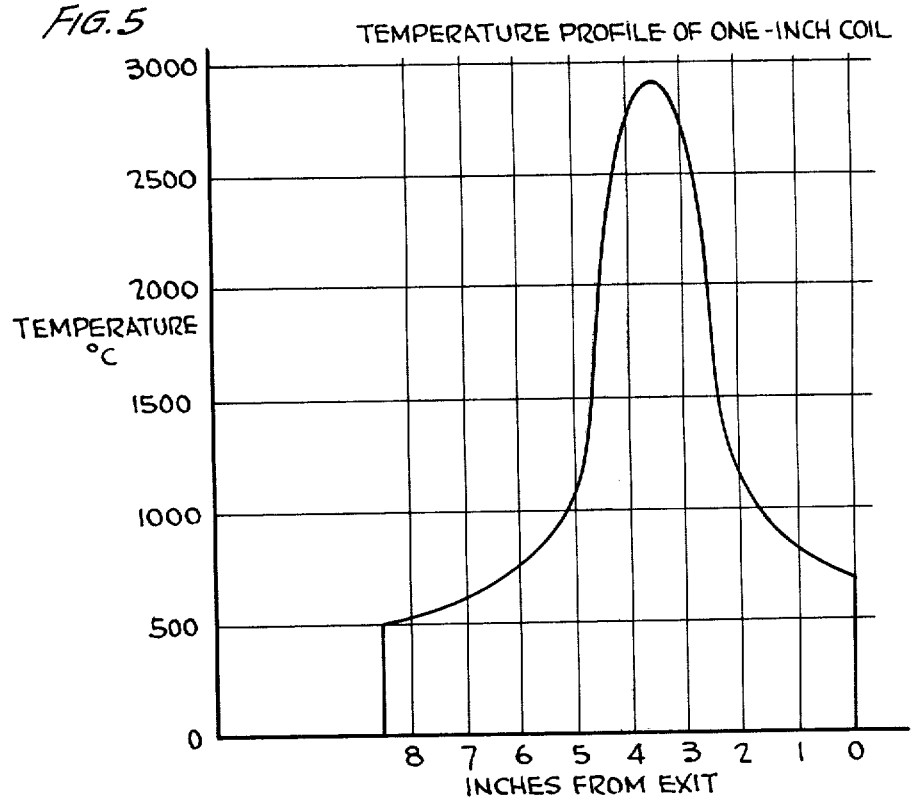
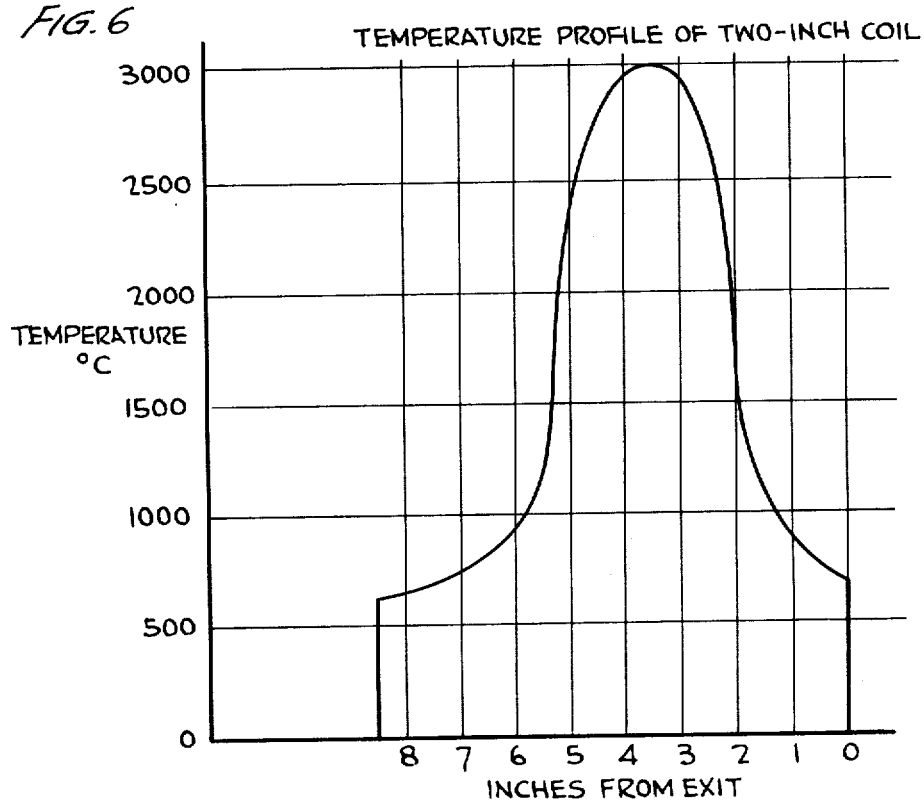

IMPROVED PROCESS FOR THE CONTINUOUS CARBONIZATION AND GRAPHITIZATION OF A STABILIZED ACRYLIC FIBROUS MATERIAL

This is a continuation of application Ser. No. 777,275, filed Nov. 20, 1968 now abandoned.

BACKGROUND OF THE INVENTION

In the past, procedures have been proposed for converting a stabilized acrylic precursor to a carbonized form in which elements in the stabilized material other than carbon, e.g. nitrogen, hydrogen, and oxygen are expelled. The term "carbonized product" as used herein is defined to be a product consisting of at least about 90 per cent carbon by weight, and preferably at least about 95 per cent carbon by weight.

The carbonization procedures of the prior art have been conducted on both batch and continuous bases, and have tended to require excessive heating times. See, for instance, U.S. Pat. No. 3,285,696 to Tsunoda which discloses the heating of a blackened preoxidized acrylic fiber on a batch basis at a temperature between 700°C. and 1200°C. for not less than one hour in an inert atmosphere to form a carbonized fiber. U.S. Pat. No. 3,313,597 to Cranch et al discloses the carbonization fo a polyacrylonitrile thread by heating to a temperature between about 700°C. and 1100°C. at a rate of temperature increase which must be below about 100°C. per hour. British Pat. No. 1,093,084 discloses a heating schedule for graphitizing a polyacrylonitrile fibrous material comprising slowly heating from 100°C. to 300°C. at a rate of increase of 10°C. to 55°C. per hour, and from 900°C. to around 3000°C. at a rate of up to 3000°C. per hour. British Patent No. 1,110,791 discloses a batch carbonization procedure in which a bundle of preoxidized polyacrylonitrile fibers is heated from 200°C. to 1000°C. in 24 hours. Belgian Pat. No. 690,072 discloses heating a preoxidized acrylic fibrous precursor from 400°C. to 720°C. or 1000°C. at a rate of 0.5°C. per minute to form a carbonized product. Belgian Pat. No. 700,655 discloses the continuous carbonization of an acrylonitrile copolymer in which the temperature is elevated from 300°C. to 1000°C. in 45 minutes, and from 1000°C. to 1480°C. in 25 minutes.

It is an object of the invention to provide a process for the carbonization of a stabilized acrylic fibrous material.

It is another object of the invention to provide a continuous process for the carbonization of a continuous length of a stabilized acrylic fibrous material which may be conducted on a rapid and economical basis.

It is another object of the invention to provide an efficient process for the carbonization of a continuous length of a stabilized acrylic fibrous material to form a carbonized product of high tenacity.

It is a further object of the invention to provide an efficient process for converting a continuous length of a stabilized acrylic fibrous material to a graphitized product of high tenacity and high modulus.

These and other objects, as well as the scope, nature and utilization of the invention will be apparent from the following detailed description and appended claims.

SUMMARY OF THE INVENTION

It has been found that a process for the continuous carbonization of a stabilized acrylic fibrous material which is non-burning when subjected to an ordinary match flame and derived from an acrylic fibrous material selected from the group consisting of acrylonitrile homopolymers and acrylonitrile copolymers which contain at least about 85 mol per cent of acrylonitrile units and up to about 15 mol per cent of one or more monovinyl units copolymerized therewith comprises passing a continuous length of the stabilized fibrous material having a temperature within the range of about 20°C. to about 500°C. through a heating zone provided with an inert atmosphere in which the stabilized acrylic material is raised within a period of about 3 seconds to about 10 minutes to a temperature within the range of about 900°C. to about 1600°C. (preferably to a temperature within the range of 1400°C. to about 1600°C.) to form a continuous length of carbonized product. A graphitized product may optionally be formed by subsequently passing the carbonized product through a heating zone provided with an inert atmosphere in which the carbonized product is heated at a temperature within the range of about 2400°C. to about 3100°C. until substantial graphitic carbon is formed.

DETAILED DESCRIPTION OF THE INVENTION

It is essential that the continuous length of acrylic fibrous material which is carbonized or carbonized and graphitized in accordance with the present invention be preliminarily stabilized to a heat-resistant form. The term "stabilized acrylic fibrous material" as used herein is defined as an acrylic fibrous material which in non-burning when subjected to an ordinary match flame and capable of undergoing carbonization while retaining its original fibrous configuration essentially intact. The stabilization reaction may be conducted by heating the acrylic material at relatively moderate temperatures. Such a stabilization procedure is commonly conducted in the presence of oxygen and results in the formation of a cyclized and preoxidized product which exhibits thermal stability not exhibited by the unmodified acrylic material. Stabilization procedures in which the cyclization reaction is catalyzed by a Lewis acid may be employed. U.S. Ser. Nos. 749,957, filed Aug. 5, 1968 of Dagobert E. Stuetz now abandoned; 749,959, filed Aug. 5, 1968 of Michael J. Ram (now U.S. Pat. No. 3,539,295); 750,018, filed Aug. 5, 1968 of Michael J. Ram and Richard N. Rulison (now abandoned); and 760,658, filed on Sept. 18, 1968 of John P. Riggs disclose preferred stabilization procedures. Each of the above-identified applications is assigned to the same assignee as the instant invention and is herein incorporated by reference. Other stabilization procedures capable of imparting thermal stability to the acrylic material may be selected.

The stabilized acrylic fibrous material is derived from a material formed primarily of recurring acrylonitrile units. For instance, the acrylic fibrous material should generally contain at least about 85 mol per cent of acrylonitrile units and up to about 15 mol per cent of one or more monovinyl units copolymerized therewith, such as styrene, methyl acrylate, methyl methacrylate, vinyl acetate, vinyl chloride, vinylidene chloride, vinyl pyridine, and the like. In a particularly preferred embodiment of the invention the stabilized acrylic fibrous material is derived from acrylonitrile homopolymers. Preferred acrylonitrile copolymers contain no more than about 5 mol per cent of one or more monovinyl comonomers copolymerized with acrylonitrile. Particularly preferred copolymers contain no more than about 1 mol per cent of one or more monovinyl comonomers copolymerized with acrylonitrile.

The continuous length of stabilized acrylic fibrous material which is carbonized or carbonized and graphitized in accordance with the present invention may be in any one of a variety of configurations. For instance, single continuous filaments, yarns, or tapes may be utilized. In a preferred embodiment of the invention, the stabilized acrylic fibrous material is in the form of a continuous filament yarn. Such a yarn may be formed prior to stabilization by conventional techniques which are well known to those skilled in the art. For instance, dry spinning or wet spinning techniques may be employed. The yarn may optionally be provided with a twist which improves its handling characteristics. For example, a twist of about 0.1 to 3 tpi, and preferably about 0.1 to 1.0 tpi, may be utilized.

The acrylic fibrous material which serves as the starting material may be highly oriented prior to stabilization. For instance, the starting material may be highly oriented by hot drawing to a relatively high single filament tensile strength of at least about 5 grams per denier prior to stabilization.

As previously indicated, prior art stabilization procedures have tended to require excessive residence times. In accordance with the present invention the continuous length of stabilized acrylic fibrous material is rapidly carbonized by increasing its temperature from within the range of about 20°C. to about 500°C. to a temperature within the range of about 900°C. to 1600°C. (preferably to a temperature within the range of about 1400°C. to about 1600°C.), within a period of about 3 seconds to about 10 minutes, and preferably within a period of about 3 seconds to about 5 minutes. The process is conducted by passing the continuous length of stabilized acrylic fibrous material through a heating zone capable of producing the requisite heating which is provided with an inert atmosphere. Suitable inert atmospheres in which the carbonization reaction may be conducted include nitrogen, argon, helium, hydrogen, etc. During the carbonization reaction elements present in the continuous length of stabilized acrylic fibrous material other than carbon, e.g. nitrogen, hydrogen, and oxygen, are expelled.

The present invention is capable of producing a carbonized fibrous product which retains essentially the same configuration as the starting material. It has been found that if the stabilized acrylic fibrous material is raised from a temperature withinn the range of about 20°C. to about 500°C. to a temperature within the range of about 900°C. to about 1600°C. in less than about 3 seconds, then the physical properties of the resulting product are adversely affected. If the period of temperature elevation is more than about 30 seconds, then any further improvement in physical properties resulting from the slower rate of temperature increase generally tends to be slight. Periods of temperature increase greater than about 10 minutes are generally to be avoided because of economic considerations.

It accordingly follows in a preferred embodiment of the invention that suitable mean heating rates for elevating the stabilized acrylic fibrous material to a temperature of about 1400°C. to about 1600°C. range from about 2°C. per second to about 300°C. per second. In a particularly preferred embodiment of the invention, the continuous length of acrylic fibrous material is heated to a temperature of about 1400°C. to about 1600°C. in about 20 seconds to about 60 seconds. Particularly preferred mean heating rates for heating to a temperature of about 1400°C. to about 1600°C. accordingly range from about 23°C. per second to about 45°C. per second. The heating rates employed need not be constant, but may be varied within the period of temperature elevation. Particularly satisfactory results have been achieved when the rate is progressively increased. The continuous length of stabilized acrylic fibrous material undergoing treatment may be maintained at a temperature within the range of about 900°C. to about 1600°C. for about 3 seconds to about 5 minutes to produce a carbonized product or the temperature may be next elevated to form a carbonized and graphitized product as discussed in detail hereafter. In a further embodiment of the invention the continuous length of stabilized material is heated to a temperature within the range of about 1400°C. to 1600°C. where it is maintained for about 3 seconds to about 60 seconds to produce a carbonized product.

In a preferred embodiment of the invention, a carbonized and graphitized product is formed by passing the continuous length of carbonized product through a heating zone provided with an inert atmosphere in which the carbonized product is heated at a temperature within a range of about 2400°C. to about 3100°C. until substantial graphitic carbon is formed. The presence of graphitic carbon may be detected by the characteristics X-ray diffraction pattern of graphite. Suitable inert atmospheres include nitrogen, argon, helium, hydrogen, etc. A graphitized product of superior modulus may generally be formed in about 10 seconds to about 1 minute while heating at about 2400°C. to about 3100°C. Longer heating times may be used if desired. The modulus of the graphitized product tends to increase with the maximum temperature achieved during graphitization. The temperature of the continuous length of fibrous material is preferably progressively increased from a temperature within the range of about 900°C. to about 1600°C. (preferably about 1400°C. to about 1600°C.) to the graphitization temperature within a period of about 2 seconds to about 30 seconds.

FIG. 1 illustrates the single filament tenacity values of carbonized and graphitized products in which various periods of temperature elevation were employed during the carbonization of a stabilized yarn. The starting material was an acrylonitrile homopolymer dry spun continuous multifilament yarn which was continuously stabilized at 270°C. for 96 minutes according to the teachings of U.S. Ser. No. 749,957 of Dagobert E. Stuetz. The time expended to elevate the temperature of the stabilized yarn from 20°C. to 1600°C. by continuous passage through a heating zone provided with an inert atmosphere to produce a carbonized product is indicated in FIG. 1. The yarn was subsequently elevated to a graphitization temperature of 2700°C., 2800°C., or 2900°C. in an inert atmosphere. If the period of temperature elevation to 1600°C. was less than about 3 seconds, then a product of superior tenacity was unachievable. It is apparent that there is little change in tenacity if the period of temperature elevation to 1600°C. is more than about 30 seconds. FIGS. 5 and 6, discussed hereafter, disclose preferred temperature profiles for producing a carbonized and graphitized product.

In FIG. 2 a plot of single filament tenacity values developed at various temperatures is presented. The single filament tenacity developed by heating to about 1400°C. to 1600°C. during the carbonization treatment of the present invention tends to remain relatively constant in spite of the subsequent heating at highly elevated temperatures utilized to produce graphitization.

In FIG. 3 a plot of single filament modulus values achieved at various temperatures is presented. The single filament modulus of the resulting product increases with the temperature utilized in its production.

FIG. 4 illustrates the effect of graphitization time and temperature on the single filament modulus with maximum graphitization temperatures of 2700°C. and 2900°C. respectively.

The equipment utilized to produce the requisite heating to carry out the process of the invention may be varied widely. It is essential that the apparatus selected be capable of producing the required temperatures while excluding the presence of an oxidizing atmosphere. For instance, suitable apparatus include induction furnaces, tube furnaces in which a hollow graphite susceptor is heated by direct resistance heating, direct resistance heating apparatus in which electric current is passed directly through the fibrous material, apparatus capable of producing reducing flames, electric arc furnaces, lasers, thermal image equipment such as solar furnaces, apparatus capable of producing low temperature plasma flames, and the like. The continuous length of fibrous material undergoing treatment is passed through one or more heating apparatus and subjected to the requisite temperatures. Temperature profiles may be provided within a given heating apparatus, or the material may be successively passed through a series of apparatus maintained at progressively increasing temperatures.

In a preferred embodiment of the invention, the stabilized acrylic fibrous material is heated by use of an induction furnace. In such a procedure, the continuous length of stabilized material is passed through a hollow graphite tube or susceptor which is situated within the windings of an induction coil. By varying the length of the graphite susceptor, the length of the induction coil, and the rate at which the material is passed through the susceptor, many apparatus arrangements capable of carrying out the present process may be selected. For large-scale production, it is of course preferred that relatively long susceptors be used so that the continuous length of material may be more rapidly passed through the same while being heated in accordance with the present invention. Care must be taken to provide a susceptor of sufficient length to insure that the rate of temperature increase is not so rapid that a product of adequate tenacity is unachievable. When producing a carbonized and graphitized product, adequate provision must be made for reaching the highly elevated temperatures if a product of maximum modulus is desired.

Also, when a carbonized and graphitized product is produced in accordance with the present invention, it is preferred that moderate tension be applied to the continuous length of material undergoing treatment.

The following examples are given as specific illustrations of the invention. It should be understood, however, that the invention is not limited to the specific details set forth in the examples.

EXAMPLES

A continuous length of an 800 fil dry spun acrylonitrile homopolymer continuous filament yarn having a total denier of 1150 was selected. The yarn was highly oriented and drawn to a single filament tenacity of 7.5 to 8.0 grams per denier. The yarn was continuously stabilized by passage for 96 minutes through a muffle furnace containing an air atmosphere maintained at 270°C. in accordance with the teachings of U.S. Ser. No. 749,957, filed August 5, 1968 of Dagobert E. Stuetz. During the stabilization procedure the yarn was allowed to shrink approximately 12 per cent in length. The preoxidized yarn contained a bound oxygen content of 9 percent by weight as determined by the Unterzaucher analysis, and was non-burning when subjected to an ordinary match flame.

Portions of the stabilized yarn were continuously passed through a Lepel 450 KC induction furnace under varying conditions utilizing a 20 KW power source to produce carbonized and graphitized products which retained the original fibrous configuration essentially intact. The lengths of the susceptors utilized were 5-½ inches, 6-½ inches, and 8-½ inches. Each susceptor was formed of graphite and possessed an outer diameter of ½ inch and an inner diameter of ⅛ inch. Water cooled copper coils were used of 1 inch (5 turns) and 2 inches (10 turns) in length having an inner diameter of ¾ inch. Yarn speeds of 3, 5.9, and 8.8 inches per minute were employed. The copper coil which encompassed a portion of the hollow graphite tube was positioned at a location essentially equidistant from the respective ends of the graphite tube. An inert atmsophere of nitrogen was maintained within the induction furnace. A tension of 100 grams was applied to the yarn as it passed through the induction furnace. In each instance the carbonized and graphitized products produced were composed of essentially pure carbon and had a specific gravity of 1.9.

The following table indicates the tensile strength and initial modulus obtained under the varying conditions indicated employing maximum graphitization temperatures of 2700°C., 2800°C. and 2900°C. The tensile strength and initial modulus values are presented in grams per denier. FIG. 5 indicates the temperature profile utilizing a susceptor having a length of 8-½ inches in conjunction with a coil having a length of one inch. FIG. 6 indicates the temperature profile utilizing a susceptor having a length of 8-½ inches in conjunction with a coil having a length of 2 inches.

TABLE

| Coil Length, inches | Susceptor Length, inches | Yarn Speed, in./min. | | Graphitization Temperature, °C. | | |
|---|---|---|---|---|---|---|
| | | | | 2700 | 2800 | 2900 |
| | | 3 | Tensile Strength | 13.3 | | 11.4 |
| | | | Initial Modulus | 2260 | | 2260 |
| | 5½ | | | | | |
| | | 8.8 | Tensile Strength | 9.78 | | 10.2 |
| | | | Initial Modulus | 1800 | | 1950 |
| 1 | 6½ | 5.9 | Tensile Strength | | 10.6 | |
| | | | Initial Modulus | | 2030 | |

TABLE – Continued

| Coil Length, inches | Susceptor Length, inches | Yarn Speed, in./min | | Graphitization Temperature, °C | | |
|---|---|---|---|---|---|---|
| | | | | 2700 | 2800 | 2900 |
| | 8½ | 3 | Tensile Strength | 12.2 | | 14.3 |
| | | | Initial Modulus | 2450 | | 2450 |
| | | 8.8 | Tensile Strength | 13.9 | | 12.2 |
| | | | Initial Modulus | 2030 | | 2110 |
| 2 | 5½ | 3 | Tensile Strength | 12.2 | | 10.5 |
| | | | Initial Modulus | 2500 | | 2660 |
| | | 8.8 | Tensile Strength | 11.1 | | 11.9 |
| | | | Initial Modulus | 1880 | | 2260 |
| | 6½ | 5.9 | Tensile Strength | | 11.0 | |
| | | | Initial Modulus | | 2190 | |
| | 8½ | 3 | Tensile Strength | 14.4 | | 12.2 |
| | | | Initial Modulus | 2500 | | 2660 |
| | | 8.8 | Tensile Strength | 13.5 | | 12.9 |
| | | | Initial Modulus | 2110 | | 2450 |

The fibrous products of the present invention may be incorporated in a binder or matrix and serve as a reinforcing medium. Such materials may accordingly serve as a lightweight load bearing component in high performance structures which find particular utility in the aerospace industry.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A continuous process for the carbonization and graphitization of a stabilized acrylic fibrous material which is non-burning when subjected to an ordinary match flame and derived from an acrylic fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith comprising continuously passing a continuous length of said fibrous material through a heating zone of a single induction furnace while said fibrous material is suspended within the confines of a hollow graphite susceptor which is inductively heated and provided with an inert gaseous atmosphere and a temperature gradient in which said fibrous material is initially raised from a temperature within the range of about 20° to about 500°C. within a period of about 3 seconds to about 10 minutes to a temperature within the range of about 900° to about 1600°C. where it is maintained for about 3 seconds to about 5 minutes to form a continuous length of carbonized fibrous material, and in which said carbonized fibrous material is subsequently raised to a temperature within the range of about 2400° to about 3100°C. to form a continuous length of graphitized fibrous material.

2. A process according to claim 1 in which said stabilized acrylic fibrous material is derived from an acrylonitrile homopolymer.

3. A process according to claim 1 in which said stabilized acrylic fibrous material is derived from an acrylonitrile copolymer which contains at least about 95 mol per cent of acrylonitrile units and up to about 5 mol per cent of one or more monovinyl units copolymerized therewith.

4. A process according to claim 1 in which said continuous length of stabilized acrylic fibrous material is a yarn.

5. A process according to claim 1 in which said temperature gradient within said heating zone of said induction furnace initially raises said fibrous material within a period of about 3 seconds to about 5 minutes to a temperature within the range of about 900° to about 1600°C.

6. A process according to claim 1 in which said temperature gradient within said heating zone of said induction furnace initially raises said fibrous material within a period of about 3 seconds to about 5 minutes to a temperature within the range of about 1400° to about 1600°C.

7. A process according to claim 1 in which said temperature gradient within said heating zone of said induction furnace initially raises said fibrous material within a period of about 20 to about 60 seconds to a temperature within the range of about 1400° to about 1600°C.

8. A process according to claim 1 in which said temperature gradient within said heating zone of said induction furnace subsequently raises said carbonized fibrous material from a temperature within the range of about 900° to 1600°C. within a period of about 2 to about 30 seconds to a temperature within the range of about 2400° to about 3100°C. where it is maintained for about 10 seconds to about 1 minute.

9. A continuous process for the carbonization and graphitization of a stabilized acrylic fibrous material which is non-burning when subjected to an ordinary match flame and derived from an acrylic fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith comprising continuously passing a continuous length of said fibrous material through a heating zone of a single induction furnace while said fibrous material is suspended within the confines of a hollow graphite susceptor which is inductively heated and provided with an inert gaseous atmosphere and a temperature gradient in which said fibrous material is initially raised from a temperature within the range of about 20° to about 500°C. within a period of about 20 to about 60 seconds to a temperature within the range of about 1400° to about 1600°C. where it is maintained for about 3 seconds to about 60 seconds to form a continuous length of carbonized fibrous material, and in which said carbonized fibrous material is subsequently raised from a temperature within the range of about 1400° to about 1600°C. within a period of about 2 to about 30 seconds to a temperature within the range of about 2400° to about 3100°C. where it is maintained for about 10 seconds to about 1 minute.

10. A process according to claim 9 in which said stabilized acrylic fibrous material is derived from an acrylonitrile homopolymer.

11. A process according to claim 9 in which said stabilized acrylic fibrous material is derived from an acrylonitrile copolymer which contains at least about 95 mol percent of acrylonitrile units and up to about 5 mol percent of one or more monovinyl units copolymerized therewith.

12. A process according to claim 9 in which said stabilized acrylic fibrous material is yarn.

13. A process according to claim 9 in which said inert gaseous atmosphere is nitrogen.

* * * * *